(12) United States Patent
Tian et al.

(10) Patent No.: US 8,520,401 B2
(45) Date of Patent: *Aug. 27, 2013

(54) MOTHERBOARD ASSEMBLY HAVING SERIAL ADVANCED TECHNOLOGY ATTACHMENT DUAL IN-LINE MEMORY MODULE

(75) Inventors: Bo Tian, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 100 days.

This patent is subject to a terminal disclaimer.

(21) Appl. No.: 13/221,915

(22) Filed: Aug. 31, 2011

(65) Prior Publication Data

US 2013/0044450 A1    Feb. 21, 2013

(30) Foreign Application Priority Data

Aug. 18, 2011   (CN) .......................... 2011 1 0237549

(51) Int. Cl.
*H05K 1/11* (2006.01)

(52) U.S. Cl.
USPC ...... 361/785; 361/803; 361/679.31; 361/748; 361/737; 361/792; 365/51; 365/52; 365/63; 365/72; 710/313; 710/316; 439/65; 439/485

(58) Field of Classification Search
USPC .................. 361/785, 803, 679.31, 748, 737; 361/792; 365/51, 52, 63, 72; 710/313, 316; 439/65, 485
See application file for complete search history.

(56) References Cited

U.S. PATENT DOCUMENTS

| | | | | |
|---|---|---|---|---|
| 5,513,135 A * | 4/1996 | Dell et al. | ........................ | 365/52 |
| 5,634,803 A * | 6/1997 | Cheng et al. | ................... | 439/157 |
| 5,661,677 A * | 8/1997 | Rondeau et al. | ................ | 365/63 |
| 5,859,792 A * | 1/1999 | Rondeau et al. | ................ | 365/52 |
| 5,963,463 A * | 10/1999 | Rondeau et al. | ................ | 365/52 |
| 6,004,142 A * | 12/1999 | Wark | ............... | 439/74 |
| 6,034,919 A * | 3/2000 | Noonan, II | ................ | 365/233.5 |
| 6,200,144 B1 * | 3/2001 | Wark | ............... | 439/74 |
| 6,227,887 B1 * | 5/2001 | Choy | ............ | 439/160 |
| 6,243,282 B1 * | 6/2001 | Rondeau et al. | ................ | 365/52 |
| 6,256,217 B1 * | 7/2001 | Rondeau et al. | ................ | 365/52 |
| 6,414,868 B1 * | 7/2002 | Wong et al. | ..................... | 365/51 |
| 6,461,169 B1 * | 10/2002 | Harrison et al. | ................ | 439/65 |
| 6,629,855 B1 * | 10/2003 | North et al. | .................... | 439/325 |
| 6,683,372 B1 * | 1/2004 | Wong et al. | ................... | 257/686 |
| 6,710,614 B1 * | 3/2004 | Wark | ........................ | 324/756.02 |
| 6,721,189 B1 * | 4/2004 | Haba | ............................ | 361/792 |
| 6,981,886 B1 * | 1/2006 | Co et al. | ........................ | 439/160 |
| 7,029,297 B1 * | 4/2006 | Co et al. | ........................ | 439/152 |
| 7,363,417 B1 * | 4/2008 | Ngai | ............................ | 710/316 |
| 7,539,024 B1 * | 5/2009 | Karabatsos | ................... | 361/785 |
| 7,664,902 B1 * | 2/2010 | Chow et al. | ................... | 710/301 |

(Continued)

*Primary Examiner* — Xiaoliang Chen
(74) *Attorney, Agent, or Firm* — Altis Law Group, Inc.

(57) ABSTRACT

A motherboard assembly includes a motherboard and a serial advanced technology attachment dual-in-line memory module (SATA DIMM) module with a circuit board. The motherboard includes an expansion slot and a storage device interface. An edge connector is set on a bottom edge of the circuit board to be detachably engaged in the expansion slot, and a notch is set on a bottom edge of the circuit board to engage in a protrusion of the expansion slot. A SATA connector of the circuit board is connected to the storage device interface of the motherboard.

4 Claims, 2 Drawing Sheets

(56) References Cited

U.S. PATENT DOCUMENTS

| | | | |
|---|---|---|---|
| 2001/0051457 A1* | 12/2001 | MacLaren et al. | 439/488 |
| 2002/0041509 A1* | 4/2002 | Rondeau et al. | 365/52 |
| 2002/0133684 A1* | 9/2002 | Anderson | 711/200 |
| 2003/0043613 A1* | 3/2003 | Doblar et al. | 365/63 |
| 2003/0073326 A1* | 4/2003 | MacLaren et al. | 439/43 |
| 2003/0078749 A1* | 4/2003 | Eberle et al. | 702/80 |
| 2004/0100812 A1* | 5/2004 | Wu | 365/72 |
| 2004/0161953 A1* | 8/2004 | MacLaren et al. | 439/65 |
| 2004/0229480 A1* | 11/2004 | Haba | 439/67 |
| 2006/0056214 A1* | 3/2006 | Petersen et al. | 365/51 |
| 2006/0114661 A1* | 6/2006 | Haba | 361/749 |
| 2006/0267172 A1* | 11/2006 | Nguyen et al. | 257/681 |
| 2007/0224854 A1* | 9/2007 | Bacha et al. | 439/79 |
| 2008/0288714 A1* | 11/2008 | Salomon et al. | 711/103 |
| 2009/0080164 A1* | 3/2009 | Purcell et al. | 361/737 |
| 2010/0142243 A1* | 6/2010 | Baxter | 365/51 |
| 2010/0241799 A1* | 9/2010 | Schuette | 711/104 |
| 2010/0254096 A1* | 10/2010 | Kim et al. | 361/737 |
| 2010/0254100 A1* | 10/2010 | Kim et al. | 361/752 |
| 2011/0143579 A1* | 6/2011 | Karabatsos | 439/485 |
| 2011/0153903 A1* | 6/2011 | Hinkle et al. | 710/313 |
| 2011/0176273 A1* | 7/2011 | Olsen et al. | 361/679.47 |
| 2011/0320690 A1* | 12/2011 | Petersen et al. | 711/103 |
| 2012/0033370 A1* | 2/2012 | Reinke et al. | 361/679.4 |
| 2012/0059967 A1* | 3/2012 | Hinkle et al. | 710/313 |
| 2012/0059970 A1* | 3/2012 | Hinkle et al. | 710/316 |
| 2012/0320518 A1* | 12/2012 | Chen et al. | 361/679.31 |
| 2012/0320538 A1* | 12/2012 | Wu et al. | 361/748 |
| 2013/0003285 A1* | 1/2013 | Liang et al. | 361/679.31 |
| 2013/0016471 A1* | 1/2013 | Chen | 361/679.31 |

* cited by examiner

MOTHERBOARD ASSEMBLY HAVING SERIAL ADVANCED TECHNOLOGY ATTACHMENT DUAL IN-LINE MEMORY MODULE

CROSS-REFERENCE OF RELATED ART

Relevant subject matter is disclosed in a pending U.S. patent application with application Ser. No. 13/172,603, filed on Jun. 29, 2011, with the same title "SERIAL ADVANCED TECHNOLOGY ATTACHMENT DIMM", a pending U.S. patent application with application Ser. No. 13/207,680, filed on Aug. 11, 2011, with the same title "MOTHERBOARD ASSEMBLY HAVING SERIAL ADVANCED TECHNOLOGY ATTACHMENT DUAL IN-LINE MEMORY MODULE", which are assigned to the same assignee as this patent application.

BACKGROUND

1. Technical Field

The present disclosure relates to a motherboard assembly having a serial advanced technology attachment dual in-line memory module (SATA DIMM).

2. Description of Related Art

At present, solid state drives (SSD) store data on chips instead of on magnetic or optical discs, to be used for adding storage capacity. One type of SSD has the form factor of a DIMM module and it is called a SATA DIMM module. The SATA DIMM module can be inserted into a memory slot of a motherboard, to receive voltages from the motherboard through the memory slot and receive hard disk drive (HDD) signals through SATA connectors arranged on the SATA DIMM module and connected to a SATA connector of the motherboard. However, the number of memory slots is limited, thus the memory slots of the motherboard can only receive a limited quantity of SATA DIMMs. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

Figure 1:
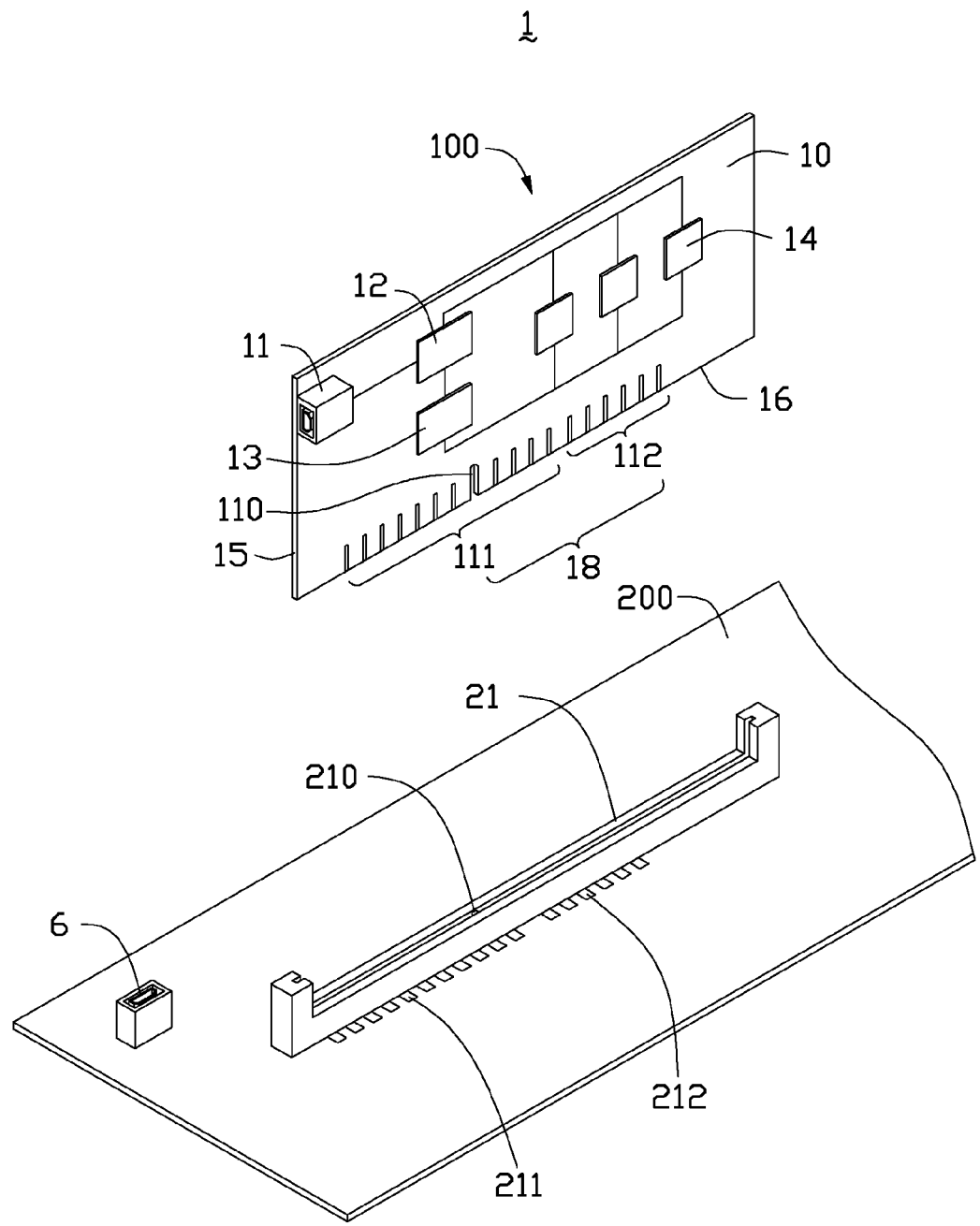
FIG. 1 is a schematic diagram of a motherboard assembly in accordance with an exemplary embodiment of the present disclosure.

The disclosure, including the drawing, is illustrated by way of example and not by way of limitation. References to "an" or "one" embodiment in this disclosure are not necessarily to the same embodiment, and such references mean at least one.

Figure 2:
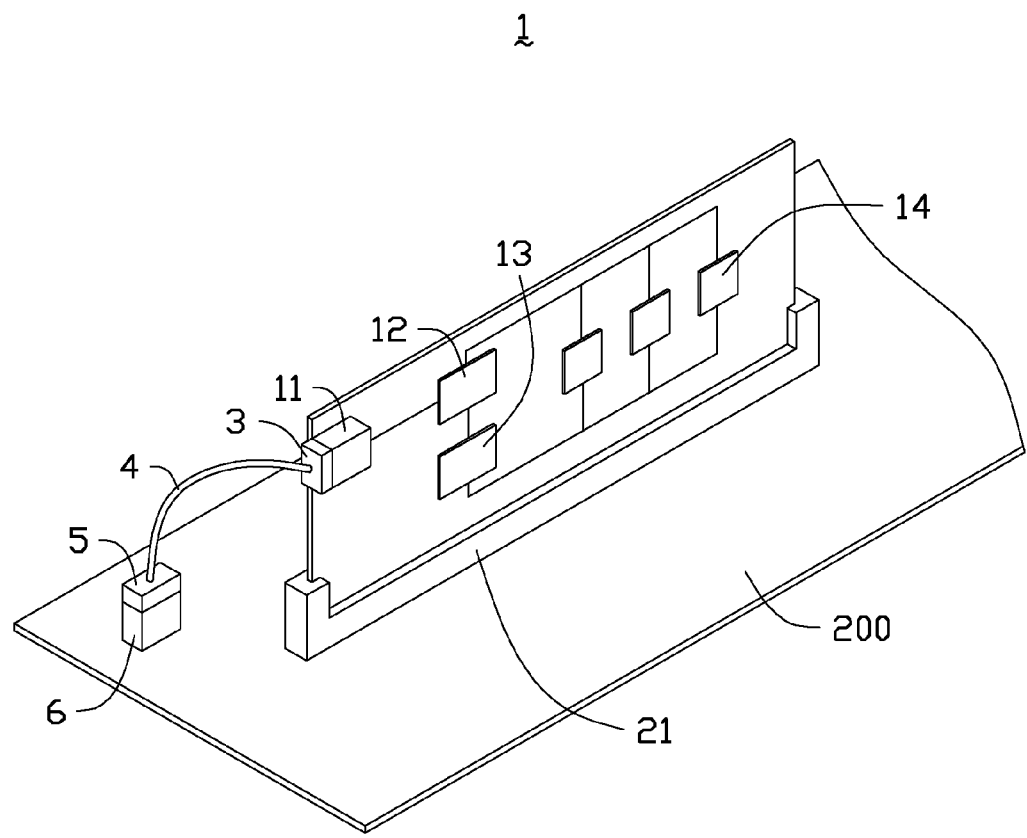
FIG. 2 is an assembled diagram of the motherboard assembly of FIG. 1.

Referring to FIGS. 1 and 2, a motherboard assembly 1 in accordance with an exemplary embodiment includes a serial advanced technology attachment dual-in-line memory module (SATA DIMM) 100, a motherboard 200, an expansion slot 21, and a storage device interface 6. The expansion slot 21 and the storage device interface 6 are all arranged on the motherboard 200. In one embodiment, the expansion slot 21 is a peripheral component interconnection express (PCIe) slot.

The SATA DIMM module 100 includes a circuit board 10. A SATA connector 11, a control chip 12, a voltage converting circuit 13, and a plurality of storage chips 14, which are all arranged on the circuit board 10. In one embodiment, the SATA connector 11 is located adjacent to a short edge 15 of the circuit board 10 and connected to the storage device interface 6 through a cable 4 with two interfaces 3 and 5. An edge connector 18 is arranged on a long edge 16 of the circuit board 10, to insert into the expansion slot 21. A notch 110 is defined in the long edge 16. The edge connector 18 includes a plurality of power pins 111 and a plurality of ground pins 112. The power pins 111 are connected to the voltage converting circuit 13. The ground pins 112 are connected to a ground layer (not shown) of the circuit board 10. The SATA connector 11 is connected to the control chip 12. The voltage converting circuit 13 is connected to the control chip 12 and each storage chip 14, to receive a voltage from the edge connector 18 and converts the received voltage, and provides the converted voltage to the control chip 12 and each storage chip 14. The control chip 12 is connected to each storage chip 14, to receive a hard disk drive (HDD) signal from the SATA connector 11 and transmits the received HDD signal to each storage chip 14. In one embodiment, the storage device interface 6 is a SATA connector.

The expansion slot 21 includes a plurality of pins and a protrusion 210. The protrusion 212 is located in the expansion slot 21 and adjacent to a side of expansion slot 21, to engage with the notch 110. The pins of the expansion slot 21 includes a plurality of power pins 211 corresponding to the power pins 111, and ground pins 212 corresponding to the ground pins 112. The power pins 211 and the ground pins 212 are respectively connected to a power layer and a ground layer (not shown) of the motherboard 200.

In assembling, the SATA DIMM module 100 is connected to the expansion slot 21 through the edge connector 18. The power pins 111 are connected to the power pins 211, and the ground pins 112 are connected to the ground pins 212. The protrusion 210 is engaged in the notch 110. The interface 3 at a first end of the cable 4 is connected to the SATA connector 11. The interface 5 at a second end of the cable 4 is connected to the storage device interface 6.

In use, when the motherboard 200 receives power, the motherboard 200 outputs a voltage to the voltage converting circuit 13 through the power pins 211 and 111. The voltage converting circuit 13 converts the received voltage and provides it to the control chip 12 and each storage chip 14 of the SATA DIMM module 100. At the same time, the motherboard 200 outputs an HDD signal to the control chip 12 through the interfaces 6 and 5, the cable 4, the storage device interface 3, and the SATA connector 11 to communicate with the SATA DIMM module 100.

The motherboard 200 can communicate with the SATA DIMM module 100, which is connected to the expansion slot 21 of the motherboard 200. Therefore, the motherboard assembly 1 can expand storage capacity through the expansion slot 21 arranged on the motherboard 200.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A motherboard assembly comprising:
a motherboard comprising:
   an expansion slot comprising a plurality of first power pins, a plurality of first ground pins, and a protrusion set in the expansion slot; and
   a storage device interface arranged on the motherboard; and
a serial advanced technology attachment dual-in-line memory module (SATA DIMM) comprising:
   a circuit board defining a notch in a bottom edge of the circuit board;
   a SATA connector arranged on the circuit board and connected to the storage device interface of the motherboard;
   a plurality of storage chips;
   a control chip arranged on the circuit board and connected to the SATA connector and the plurality of storage chips;
   a voltage converting circuit arranged on the circuit board and connected to the control chip and the plurality of storage chips; and
   an edge connector arranged on the bottom edge of the circuit board, to insert into the expansion slot of the motherboard, wherein the edge connector comprises a plurality of second power pins connected to the voltage converting circuit and corresponding to the first power pins and a plurality of second ground pins corresponding to the first ground pins; wherein in response to the edge connector of the SATA DIMM module being engaged in the expansion slot, the second power pins of the edge connector are connected to the first power pins of the expansion slot, the second ground pins of the edge connector are connected to the first ground pins of the expansion slot, and the notch of the SATA DIMM module engages with the protrusion of the expansion slot.

2. The motherboard assembly of claim 1, wherein the SATA connector of the SATA DIMM module is connected to the storage device interface of the motherboard through a cable with two interfaces.

3. The motherboard assembly of claim 2, wherein the storage device interface of the motherboard is a serial advanced technology attachment (SATA) connector.

4. The motherboard assembly of claim 2, wherein the expansion slot of the motherboard is a peripheral component interconnection express (PCIe) slot.

* * * * *